United States Patent
Takeda

(10) Patent No.: US 6,826,024 B2
(45) Date of Patent: Nov. 30, 2004

(54) POWER LINE WITH POWER SHUTDOWN DEVICE INCLUDING DETECTION LINE

(75) Inventor: Hideaki Takeda, Saitama (JP)

(73) Assignee: Uchiya Thermostat Co., Ltd., Misato (JP)

( * ) Notice: Subject to any disclaimer, the term of this patent is extended or adjusted under 35 U.S.C. 154(b) by 94 days.

(21) Appl. No.: 10/179,134

(22) Filed: Jun. 25, 2002

(65) Prior Publication Data

US 2003/0002235 A1 Jan. 2, 2003

(30) Foreign Application Priority Data

Jul. 2, 2001 (JP) ........................................ 2001-200448

(51) Int. Cl.[7] ................................................. H02H 5/04
(52) U.S. Cl. .......................................... 361/42; 361/103
(58) Field of Search ........................ 361/54, 56, 42–50, 361/99, 103, 104–108, 115, 93.1

(56) References Cited

U.S. PATENT DOCUMENTS

| | | | | |
|---|---|---|---|---|
| 4,751,603 A | * | 6/1988 | Kwan ........................... | 361/42 |
| 4,791,519 A | * | 12/1988 | Madsen ........................ | 361/42 |
| 5,166,853 A | * | 11/1992 | Gershen et al. ............... | 361/50 |
| 5,381,097 A | * | 1/1995 | Takatori et al. .............. | 324/512 |
| 5,627,719 A | * | 5/1997 | Gaston ........................ | 361/103 |
| 5,801,915 A | * | 9/1998 | Kholodenko et al. ........ | 361/234 |
| 5,841,617 A | * | 11/1998 | Watkins et al. .............. | 361/106 |
| 6,525,914 B1 | * | 2/2003 | Legatti ......................... | 361/42 |
| 6,693,779 B2 | * | 2/2004 | DiSalvo ........................ | 361/42 |

* cited by examiner

*Primary Examiner*—Jonathan Salata
(74) *Attorney, Agent, or Firm*—Greer, Burns & Crain, Ltd

(57) ABSTRACT

A less expensive power cord with a safety device detects the damage of the power lines in a cord at an earlier stage, shuts off the power, and guarantees the safety of an electric appliance and its environment. The power cord has two power lines and a detection line provided between them, and the sheath portion between the detection line and the power line is thinner than the insulating sheath material of the cord contact portion. When the power line becomes half-broken and damaged by the fatigue with the passage of time due to bendings and pulls, the broken ends of the thin lines of the power line are untwisted and contact the thin sheath portion of the detection line, a current flows through the detection line, a current difference occurs in the power line, the power shutdown device detects the difference, releases a latch, and opens a constant close interlocking switch, thereby shutting off the power.

5 Claims, 4 Drawing Sheets

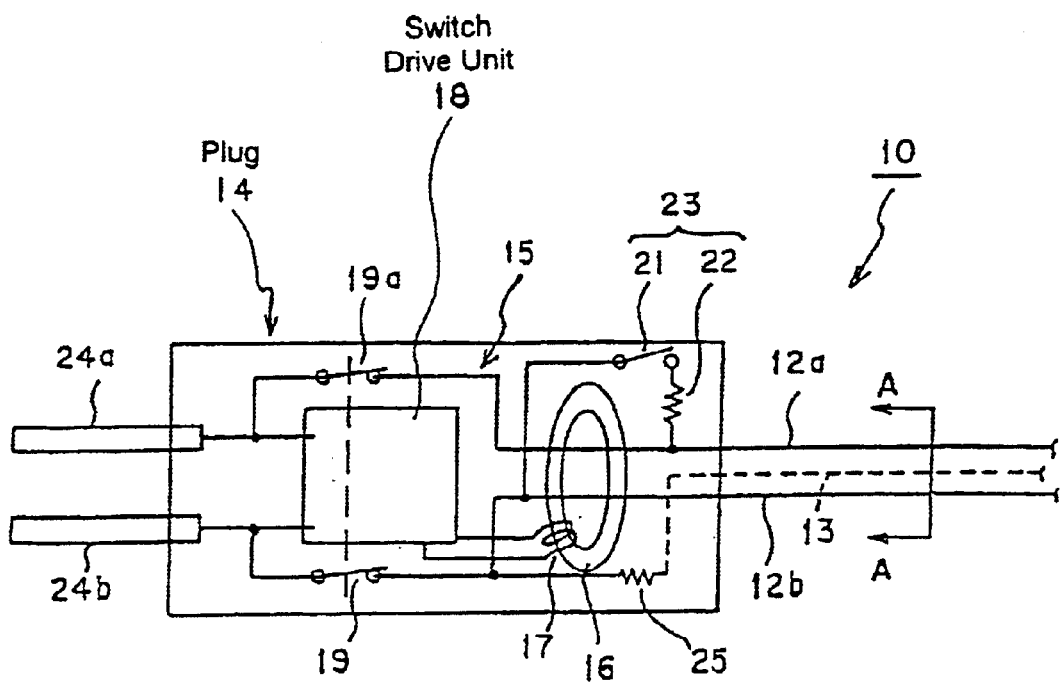
F I G. 2A
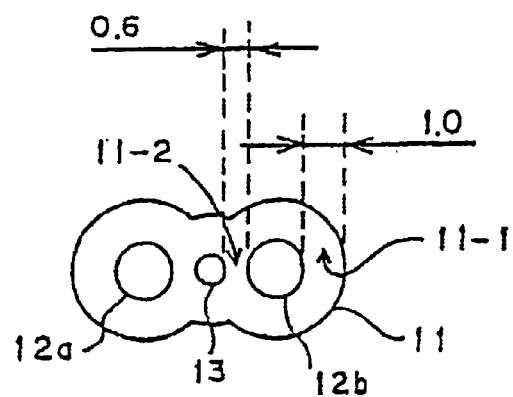
F I G. 2B

POWER LINE WITH POWER SHUTDOWN DEVICE INCLUDING DETECTION LINE

BACKGROUND OF THE INVENTION

1. Field of the Invention

The present invention relates to a power cord with plug for use in an electric appliance, and more specifically to a less expensive power cord with a safety device for detecting damage of a power line in the cord at an earlier stage, shutting off the power, and guaranteeing the safety of the electric appliance and its environment.

2. Description of the Related Art

There has been a conventional power cord with plug for use in supplying power to an electric appliance from a commercial power receptacle. Since the power cord is normally bent and pulled each time it is used, the repeated bendings and pulls cause fatigue with the passage of time especially at the base portion of the plug or the electric appliance, thereby often damaging the cord at these portions.

Conventionally, to prevent the damage of the cord caused by the bendings and pulls, there have been no effective methods other than thickening a power line or a sheath. However, these methods only protect a cord against bendings and pulls, but lose the flexibility of the cord, and are poor in ease-of-use. In this situation, to improve the protection of power cords against bendings and pulls, there are a number of cases in which a power cord is reinforced by providing a cord protector for the power cord at the base portion of the plug or the electric appliance.

FIG. 1 shows a power cord provided with the above mentioned cord protector. As shown in FIG. 1, the cord contact portion of a power cord 1 is covered with an insulating sheath material 2, and contains two power lines 3 arranged in parallel. One end of the cord (left end in FIG. 1) is fixed to a plug 4, and the two power lines 3 are connected to two respective plug terminals 5 of the plug 4. A cord protector 6 is attached to the base portion of the plug 4. Thus, the base portion of the plug to which strong bending and pulling force is applied can be reinforced, thereby successfully generating a durable code.

In an example often reported in the U.S., a hair dryer is carelessly dropped into a bathtub, and an electric shock accident occurs in the bathtub. Therefore, to prevent the electric shock accident, it has been made mandatory to attach a ground-fault interrupter to a plug. The ground-fault interrupter can either shut off the power by detecting a ground-fault current or shut off the power by providing a detection line for detecting a current flowing through it. The ground-fault interrupter which detects a ground-fault current can be applied when a bathtub is insulated, and the ground-fault interrupter which is provided with the detection line can be applied when a bathtub is not insulated.

However, although a power cord is effectively reinforced by any means as by the above mentioned cord protector, the inside power lines are broken with fatigue with the passage of time with years of use. However, since the power lines of a power cord are covered with a sheath material, and are safely maintained by the sheath material, they are not completely broken and are in a half-broken state in many cases. Thus, if the power cord is used with the power lines maintained in the half-broken state, then the electrical resistance of the half-broken portion becomes high, and a large amount of heat is locally generated at this portion, thereby often causing the danger of a fire.

Furthermore, when a heater appliance such as a hair dryer, an electric ironing device, etc. is constantly used in hand, the power cord in use is subject to a heavy load. Therefore, the power cord is more seriously damaged and more easily broken than the power cords of other types of appliances. However, since the heater appliances consume larger power, a large amount of heat is generated in the above mentioned half-broken state, thereby easily causing the danger of a fire.

The ground-fault interrupter for preventing an electric shock accident in a bathtub as in the example in the U.S. has been developed to shut off the power if a leakage occurs when a user mishandles the appliance or if the appliance becomes wet by a careless user. Therefore, it does not prevent the danger caused by other factors, for example, an internal break, etc. from fatigue with the passage of time, etc.

SUMMARY OF THE INVENTION

The present invention has been developed to solve the above mentioned problems with the conventional technology, and aims at providing a less expensive power cord with a safety device for detecting the damage of the power lines in a cord at an earlier stage, shutting off the power, and guaranteeing the safety of an electric appliance and its environment.

The power cord with a safety device according to the present invention is a power cord for supplying the power from a commercial power receptacle to an electric appliance, its cord contact portion is covered with an insulating sheath material, the cord contains two power lines and a detection line, a plug includes a power shutdown device for operating upon detection of the current flowing through the detection line. The detection line is provided between two power lines arranged in parallel, and the sheath portions between each of the two power lines and the detection line is thinner than the sheath portion of the cord contact portion.

The above mentioned detection line is covered with the sheath material having a lower melting point than the sheath material of the power line, and covered with a conductive sheath material.

Thus, when the power line is damaged by the fatigue with the passage of time by bendings and pulls in use, etc., the detection line and the power line more easily contact each other and make a short-circuit, thereby successfully preventing the local generation of a large amount of heat by an electric shock from a damaged portion and by use without knowing the damage. Furthermore, the occurrence of a disaster such as a fire, etc. can be avoided.

The power cord with a safety device can be configured by two power lines arranged in parallel; an insulating internal sheath layer covering the power lines; a conductive sheath material provided around the internal sheath layer; an insulating external sheath layer forming a cord contact portion by covering the conductive sheath material; and a plug containing a power shutdown device operating upon detection of a current flowing through the conductive sheath material.

The power shutdown device can also be configured by, for example, a leakage detecting power shutdown device, or, for example, a wet detecting power shutdown device.

With the above mentioned configuration according to the present invention, since the damaged portion of a power line contacts the detection line when internal damage occurs before the cord contact portion is damaged, the failure by the damage of the sheath of the cord contact portion of the power line, which cannot be avoided by any means other than a conventional protector, can be successfully avoided, thereby successfully avoiding a serious failure in the environment caused by a combined effect of a leakage, an electric shock, a burn, a fire, etc. occurring by the deterioration with the passage of time as well as by careless of mistaken handling. As a result, a safe and reliable power cord can be provided.

BRIEF DESCRIPTION OF THE DRAWINGS

FIG. 2A is a typical sectional view of the wiring configuration of the power cord with a safety device according to an embodiment of the present invention, and FIG. 2B is an enlarged view showing an actual configuration of the sectional view along the line A–A' indicated by the arrow;

DESCRIPTION OF THE PREFERRED EMBODIMENTS

Figure 1:
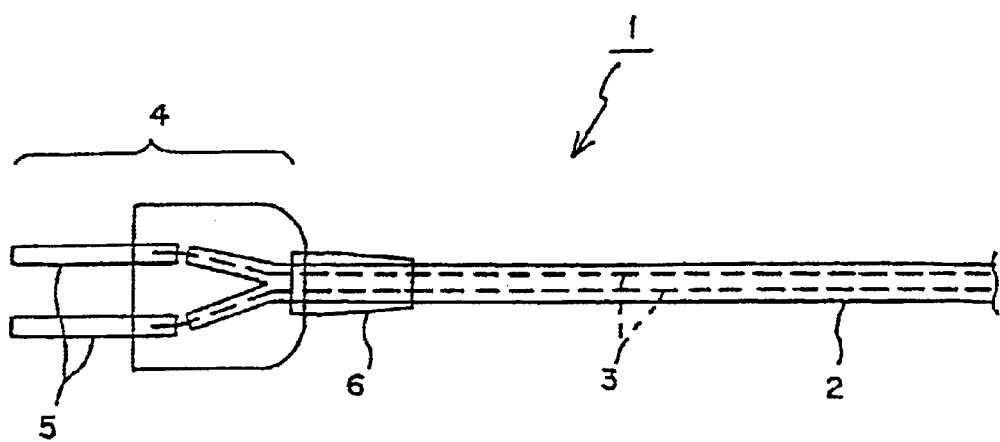
FIG. 1 shows the power cord provided with a conventional cord protector.

The embodiments of the present invention are described, below by referring to the attached drawings.

FIG. 2A is a typical sectional view of the wiring configuration of the power cord with a safety device according to an embodiment of the present invention, and FIG. 2B is an enlarged view showing an actual configuration of the sectional view along the line A–A' indicated by the arrow. As shown in FIG. 2A or 2B, a power cord 10 is formed by covering the cord contact portion with an insulating sheath material 11, two power lines 12a and 12b are arranged in parallel in the insulating sheath material 11, a detection line 13 is provided between the power lines 12a and 12b, and a plug 14 is connected to one end of the cord contact portion.

The plug 14 contains a power shutdown device 15 operating when it detects a current flowing through the detection line 13 when the power is supplied from the other end of the power lines 12a and 12b to the electric appliance by plugging the plug 14 in the commercial power receptacle. The power shutdown device 15 is obtained by connecting the detection line 13 according to the present invention to a normal leakage detecting power shutdown device.

The power shutdown device 15 comprises a sensor core 16, a sensor coil 17 wound around the sensor core 16, a switch drive unit 18 operating based on the output of the sensor coil 17, constant close interlocking switches 19a and 19b released by the switch drive unit 18 in an abnormal state, and a test circuit 23 comprising a constant open switch 21 and a resistor 22.

The power lines 12a and 12b connected to the two plug terminals 24a and 24b of the plug 14 through the constant close interlocking switches 19a and 19b are inserted into the sensor core 16. The detection line 13 passes outside the sensor core 16, and is connected to the plug terminal 24b through a resistor 25 and the constant close interlocking switch 19b.

In a normal state, since the same amount of currents flow in the opposite directions through the power lines 12a and 12b inserted into the sensor core 16, the induced magnetic force is offset, thereby generating no magnetic force line in the sensor core 16. Therefore, no current flows through the sensor coil 17. However, if there occurs a leakage in the electric appliance not shown in the drawings attached to the other end of the power cord 10 due to a careless or mistaken handling such as a drop into a bathtub, etc., then there arises a current difference by an amount of leakage between the power line 12a (or 12b) on the leakage side and the power line 12b (or 12a) on the non-leakage side. In response to the amount of the current difference, a magnetic force line is generated in the sensor core 16. In response to the magnetic force line, a current is generated in the sensor coil 17. The current is detected by the switch drive unit 18.

The switch drive unit 18 is not shown in the attached drawings, but comprises, for example, an amplifier circuit, a latch type solenoid, etc., and a weak current from the sensor coil 17 is detected by the amplifier circuit. That is, the output of the amplifier circuit closes the energized circuit in the switch drive unit 18, and passes the power current to the latch type solenoid. Thus, the latch type solenoid operates, and the constant close interlocking switches 19a and 19b are released, thereby shutting off the power.

The test circuit 23 is used to confirm that the power shutdown device 15 correctly operates by shutting off the power by the above mentioned effect through an artificial short-circuit of the portion subsequent to the sensor core 16 of the power line 12a and the portion preceding to the sensor core 16 of the power line 12b by setting the constant open switch 21 in a close state by a manual external operation or a jig after connecting the plug terminals 24a and 24b to a testing power circuit after assembly in the factory or before shipment from the factory.

Thus, the power cord 10 has the function of shutting off the power when there occurs a leakage due to common careless or mistaken handling, and further has the function of shutting off the power by early detecting an internal half-broken state due to the fatigue with the passage of time. That is, the cord contact portion of the power cord 10 is formed such that the thickness of a sheath portion 11-1 covering the entire unit can be 1.0 mm as shown in FIG. 2B, and the thickness (distance) of a sheath portion 11-2 covering the detection line 13 through the power line 12a or 12b can be 0.6 mm. That is, the sheath portion 11-2 between the detection line 13 and the power line 12a or 12b is formed thinner than the sheath portion 11-1 of the cord contact portion.

In the example shown in FIG. 2B, the sheath portion 11-2 between the detection line 13 and the power line 12a or 12b is about ⅔ times as thick as the sheath portion 11-1. However, the thickness is not limited to this value. For example, the relationship between them can be arbitrarily set so far as the thickness of the sheath portion 11-2 is smaller than the thickness of the sheath portion 11-1.

Thus, if the power line 12a or 12b enters the half-broken state and damaged due to the fatigue with the passage of time, etc. by bendings and pulls while using the line, then the damaged and broken ends of the thin lines of the power line 12a or 12b normally formed by twisting a number of thin lines are untwisted and easily contact the detection line 13 through the damaged portion of the sheath portion 11-2 between the detection line 13 and the power line 12a or 12b normally thinner than the sheath portion 11-1.

When the detection line 13 contacts the power line 12a, the power is shut off by the above mentioned effect of the short circuit between the power lines 12a and 12b.

Furthermore, when the detection line 13 contacts the power line 12b, the current from the plug terminal 24b flows separately through the inside (power line 12b) and the outside (detection line 13) of the sensor core 16. Also in this case, a small current difference occurs between the power lines 12a and 12b encompassed by the sensor core 16. Therefore, if the sensor core 16 and the sensor coil 17 can be configured as a zero-phase current transformer (ZCT) using a toroidal coil having a sensitive magnetic core, and the value of the resistor 25 can be set to an appropriate value, then the above mentioned small current difference can be detected, thereby also successfully shutting off the power by the similar effect described above.

Figure 3A:
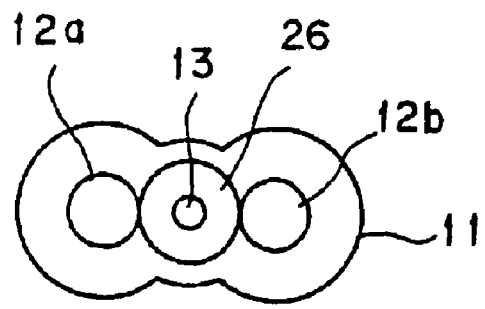
FIGS. 3A, 3B, and 3C show examples of other configurations in which the power line of the power cord is in a half-broken state and a broken thin line can easily contact the detection line.
Figure 3B:
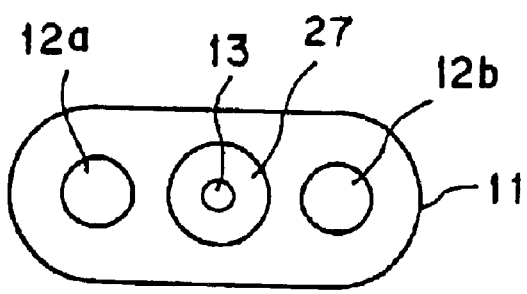
Figure 3C:
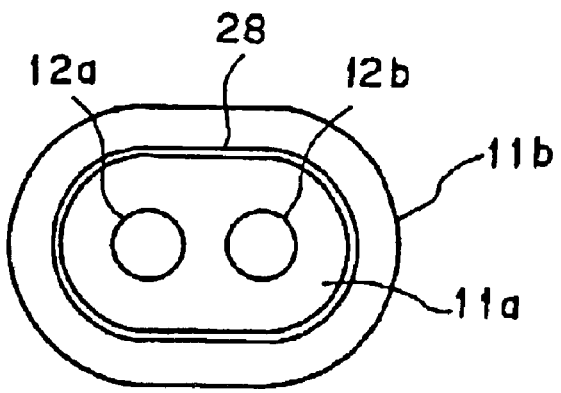

In the above mentioned embodiment, the sheath portion 11-2 between the detection line 13 and the power line 12a or 12b is formed thinner than the sheath portion 11-1. However, the relationship between the sheath portion for the detection line 13 and the sheath portion for the power line 12a or 12b (sheath portion of the cord contact portion) is not limited to this so far as the broken thin line of the power cord 10 can easily contact the detection line 13 when the power cord 10 has fatigue with the passage of time and enters the half-broken state FIGS. 3A, 3B, and 3C show examples of another configuration in which the broken thin line of the power line 12a or 12b can easily contact the detection line 13 when the power line 12a or 12b enters a half-broken state by the fatigue with the passage of time of the power cord 10. FIG. 3A shows an example of the configuration in which a sheath portion 26 of the detection line 13 is, for example, polyvinyl chloride normally used as the sheath portion for the power cord, and the sheath of the power lines 12a and 12b is cross-linked polyethylene which is more heat-resistant than the polyvinyl chloride.

With the configuration, if the power cord 10 has fatigue with the passage of time or it is carelessly or mistakenly handled, the power line 12a or 12b enters the half-broken state, and the user is not aware of the situation and continues using the electric appliance, then the portion in the half-broken state is heated with increasing electric resistance. The heat melts the less heat-resistant sheath portion 26 between the detection line 13 and the power line 12a or 12b before the more heat-resistant sheath portion 11 of the cord contact portion melts. Therefore, also in this case, the half-broken portion of the thin line easily contacts the detection line 13.

Thus, the fatigue with the passage of time of the power cord 10 can be detected and the power can be shut off before a disaster takes place due to an electric shock accident of a user or a fire caused by a broken cord contact portion.

FIG. 3B shows the configuration of a sheath portion 27 of a conductive resin containing carbon grains around the detection line 13. Also in this case, if the power cord 10 has fatigue with the passage of time or it is mistakenly handled, the power line 12a or 12b enters the half-broken state, and the broken thin line contacts the conductive sheath portion 27 nearby, then the half-broken power line 12a or 12b are easily connected to the detection line 13, the power shutdown device 15 operates as described above, and the power is shut off.

FIG. 3C has the structure of a detection cover rather than a detection line. That is, it comprises the two power lines 12a and 12b arranged in parallel; an insulating internal sheath portion 11a covering the power lines 12a and 12b; a conductive sheath portion 28 replacing the detection line 13 around the internal sheath portion 11a; and an insulating external sheath portion 11b forming the cord contact portion by covering the conductive sheath portion 28. The above mentioned 28 is a flexible cylindrical sheath material in the form of a net or a twisted cord.

Also in this case, if the power cord 10 has fatigue with the passage of time or it is mistakenly handled, the power line 12a or 12b enters the half-broken state, and the broken thin line contacts the conductive sheath portion 28, then a current flows through the conductive sheath portion 28 by which amount a current difference occurs relating to the power line 12a or 12b, and the current difference is detected by the power shutdown device 15, thereby shutting off the power.

With the configuration of the present embodiment, when the power line 12a or 12b is damaged, the damaged power line 12a or 12b contacts the conductive sheath portion 28 before breaking the sheath portion 11b of the cord contact portion, and the power shutdown device 15 shuts off the power. Therefore, it is the optimum configuration when safety is specifically required, that is, in designing a medical appliance and an electric appliance to be used near water facilities where a leakage and an electric shock accident can cause a serious disaster.

Figure 4A:
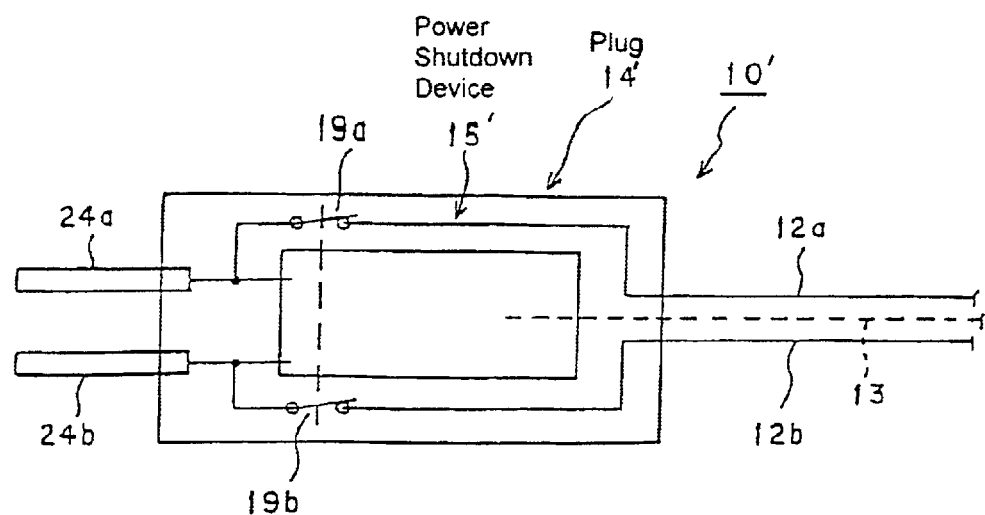
FIG. 4A is a typical sectional view of the wiring configuration of the power cord with a safety device according to another embodiment of the present invention.
Figure 4B:
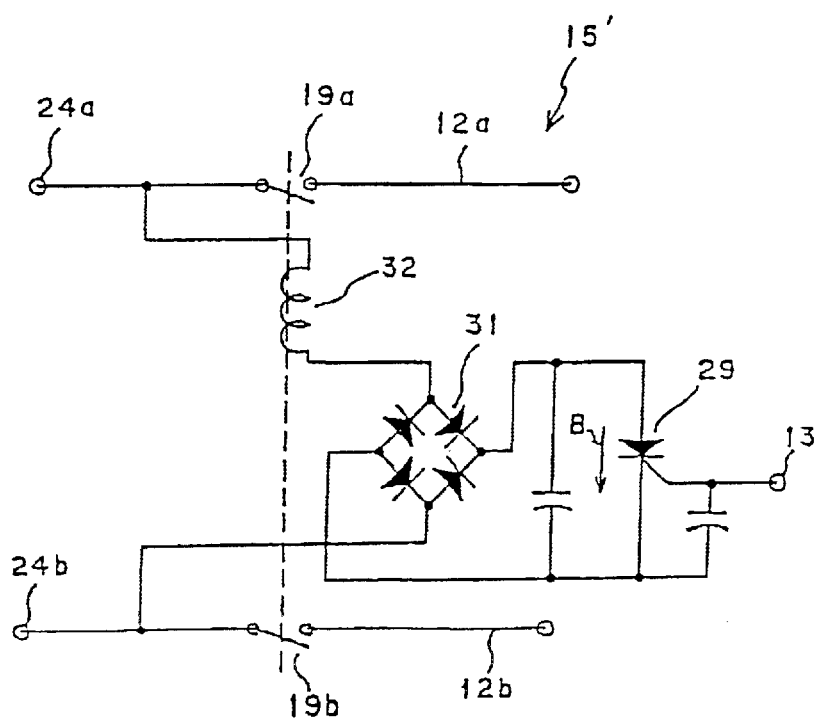
FIG. 4B shows the configuration of the circuit of the power shutdown device.

FIG. 4A is a typical sectional view of the configuration of the wiring of the power cord with a safety device according to another embodiment. FIG. 4B shows the configuration of the circuit of a power shutdown device 15'. The power shutdown device 15' embedded in a plug 14' of a power cord 10' is an example of a wet detecting power shutdown device, and an example of a semiconductor detection circuit used in the device as shown in FIG. 4B. In the example shown in FIG. 4B, the detection line 13 is connected to the gate of a semiconductor switching device (for example, a thyristor) 29. With the configuration, when a current flows through the detection line 13, the switching device 29 is turned on for the circuit in the arrow B direction, a solenoid 32 is driven by the current flowing through a bridge circuit 31, the latch is released to open the constant close interlocking switch 19a and 12b, and the current is shut off in a moment on both sides.

A method of detecting a current flowing through the detection line 13 (or the conductive sheath portion 28) from the power line 12a or 12b can be realized by various examples other than those shown in FIGS. 2A and 4B. That is, as described above by referring to the embodiments of the present invention, each type of power shutdown device can be appropriately combined with the cord having the detection line 13 (or the conductive sheath portion 28) shown in FIG. 2B or 3A through 3C. When a current flows through the detection line 13 (or conductive sheath portion 28), a current difference of a power line or a voltage change of a detection line (or a conductive sheath portion) is detected to open an interlocking switch with a latch. Thus, when an internal damage occurs before a cord contact portion is damaged, the damaged portion of a power line contacts the detection line, thereby shutting off the power.

What is claimed is:

1. A power cord with a safety device for supplying power from a commercial power receptacle to an electric appliance in which a cord contact portion is covered with an insulating sheath material, the cord contains two power lines and a detection line, a plug includes a power shutdown device for operating upon detection of a current flowing through the detection line, wherein:

the detection line is provided between two power lines arranged in parallel; and sheath portion between each of the two power lines and the detection line is thinner than the sheath portion between each of the power lines and an exterior of the cord at the cord contact portion.

2. The cord according to claim 1, wherein the detection line is covered with a sheath material having a lower melting point than a sheath material of the power lines.

3. The cord according to claim 1, wherein the detection line is covered with a conductive sheath material.

4. The cord according to claim 1, wherein said power shutdown device can be a leakage detecting power shutdown device.

5. The cord according to claim 1, wherein said power shutdown device can be a wet detecting power shutdown device.

* * * * *